United States Patent [19]

Krieger

[11] Patent Number: 4,847,541
[45] Date of Patent: Jul. 11, 1989

[54] DOOR ACTUATING SYSTEM

[76] Inventor: Steve Krieger, 150 S. Atlanta St., Roswell, Ga. 30075

[21] Appl. No.: 114,848

[22] Filed: Oct. 30, 1987

[51] Int. Cl.$^4$ .............................................. G05D 3/10
[52] U.S. Cl. ...................................... 318/468; 318/9; 318/10
[58] Field of Search ..................... 318/8, 9, 10, 11, 12, 318/266, 286, 466, 467, 468; 363/49

[56] References Cited

U.S. PATENT DOCUMENTS

| | | | |
|---|---|---|---|
| 3,132,728 | 5/1964 | Chaptois | 192/0.07 |
| 3,199,857 | 8/1965 | Klamp | 318/266 |
| 3,498,434 | 3/1970 | Richmond | 318/468 X |
| 3,874,117 | 4/1975 | Boehm | 318/442 X |
| 4,271,460 | 6/1981 | Baker | 363/49 |
| 4,272,805 | 6/1981 | Iguchi et al. | 363/19 |
| 4,401,929 | 8/1983 | Odaka et al. | 318/266 X |
| 4,418,810 | 12/1983 | Windsor | 192/0.076 |
| 4,510,422 | 4/1985 | Ogura | 318/254 |
| 4,612,485 | 9/1986 | Suska | 318/5 |
| 4,623,052 | 11/1986 | Watanabe et al. | 192/21.5 |
| 4,624,349 | 11/1986 | Wantanabe | 192/0.076 |
| 4,698,622 | 10/1987 | Goto et al. | 318/266 |
| 4,736,144 | 4/1988 | Chun-pu | 318/286 |

*Primary Examiner*—Bentsu Ro
*Attorney, Agent, or Firm*—Thomas & Kennedy

[57] ABSTRACT

A door actuating system has an electric drive motor and a chain drive connected to the door. An electromagnetic clutch connects the motor drive to the chain drive when the clutch is activated. The system includes a controller for controlling the magnitude of the voltage applied to the clutch to allow the movement of the door to build up over a finite time to a steady-state speed.

4 Claims, 2 Drawing Sheets

DOOR ACTUATING SYSTEM

BACKGROUND OF THE INVENTION

This invention relates to powered door actuating systems and, more particularly, to an electrical actuating system for industrial type refrigerators and coolers or similar container doors.

Industrial refrigerators are customarily equipped with large sliding doors weighing several hundred of pounds which require some force of power drive, most often electro-mechanical. In prior art arrangements, an electric motor of sufficient capacity is often used to power a direct drive mechanical linkage which actuates the door to open or close it. It is often the case that such linkage is both cumbersome and complicated necessitating frequent maintenance. More importantly, because the refrigerator door is generally quite heavy, the motor is subjected to overloads when initiating movement of the door because of the high inertia thereof, and, in addition, it has proved difficult to prevent sudden and sharp jerks as the door is moved or stopped, thereby placing unduly large strains on components of the actuating system.

Efforts to minimize such drawbacks have included the use of a mechanical clutch between the motor and the linkage, wherein the clutch itself is capable of absorbing some of the shock through slippage, but such efforts have not been entirely successful or reliable, inasmuch as reliance on clutch slippage per se requires that slippage be predictable and reliably and uniformly reproducible.

In the prior art, as embodied in U.S. Pat. Nos. 3,132,728 of the Chaptois, 4,623,052 of Watanabe et .al, and 4,624,349 of Watanabe, some of the drawbacks of mechanical clutches are avoided through the use of magnetic clutches. These prior art patents disclose the use of magnetic clutches in conjunction with automotive vehicle drive trains in which the degree of magnetization of the clutch is tied to the speed or torque of the automobile motor, and, by so doing, a soft start characteristic is achieved. In all of these patents, the circuitry or mechanical linkage involved in making the energization of the clutch a function of motor speed or torque is quite complicated, albeit a necessary evil in the disclosed arrangements.

SUMMARY OF THE INVENTION

The present invention, in a preferred embodiment thereof, comprises a constant speed electric motor for powering the door drive mechanism, and a drive mechanism comprising a sprocket chain which is connected to the refrigerator door and which is driven, through a magnetic clutch, by the motor. The electrical input to actuate the clutch is governed by a voltage regulator, the output of which is applied to the clutch terminals.

Across the output of the voltage regulator is a voltage divider network, one intermediate terminal of which is connected to the adjust or reference terminal of the voltage regulator. A capacitor is connected between the adjust terminal and ground.

The door itself is hung, by means of roller assemblies, from a box girder forming a track which is mounted on the stationary framework, in which the rollers of the roller assembly are free to move. As the sprocket chain is driven by the motor through the clutch, it impels the door to move and the rollers move along the length of the box girder. Mounted on the girders adjacent the top of the door are a plurality of magnetically actuated leaf switches, one of which is mounted near one end of the door when it is in the closed position. Another of the switches is mounted to be near the same end of the door when the door is in its full open position. A third leaf switch is mounted approximately midway between the other two switches. Mounted on the top of the door is an elongated bar magnet for actuating the leaf switches. The magnet is positioned so that any one of the switches is actuated prior to the door reaching the limits of its travel, thereby de-activating the magnetic clutch and motor and permitting the door to coast to its limit. The coasting feature serves to reduce materially the shocks to the drive system that would occur if the door were driven to its limit.

When the door is actuated, the voltage divider and capacitor across the output of the voltage regulator cause the voltage applied to the magnetic clutch to build up slowly, thereby producing a soft start for the door. As the door approaches its limit of its travel, the appropriate leaf switch is actuated, cutting off the voltage to the magnetic clutch and letting the door coast to its limit. Thus, regardless of the direction of travel of the door, sudden starts and stops with attendant shocks to the actuating mechanism are avoided.

DETAILED DESCRIPTION

Figure 1:
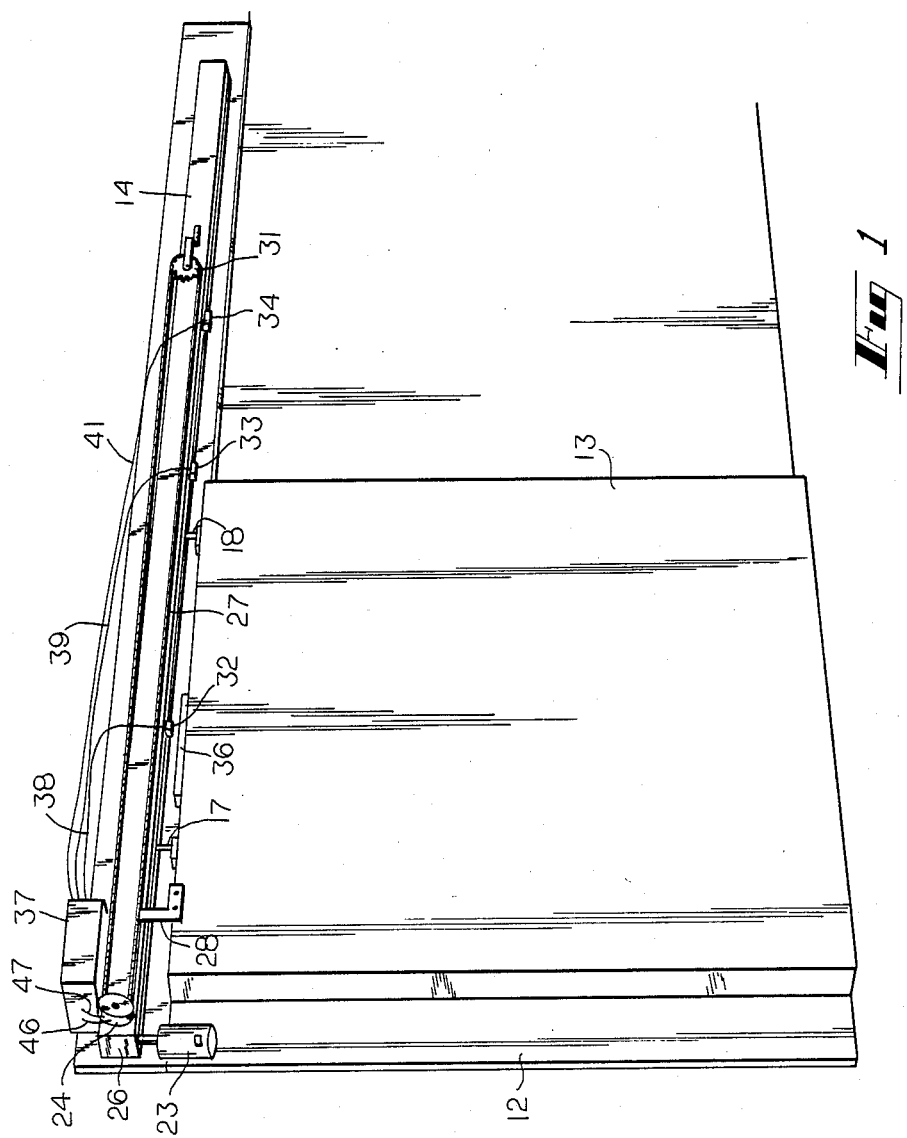
FIG. 1 is a perspective view of a refrigerator door and the actuating assembly therefor.
Figure 2:
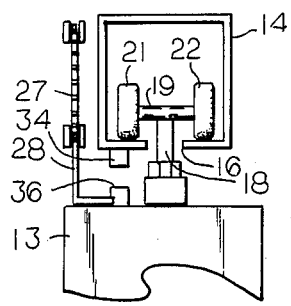
FIG. 2 is a cross-sectional view of the roller and hanger arrangement for the door.

In FIG. 1 there is depicted the refrigerator door actuating system of the present invention. A refrigerator 12, only one wall of which is shown, is equipped with a sliding or rolling door 13. As seen in FIGS. 1 and 2, door 13 is suspending from a hollow box girder 14 having a longitudinally extending slot 16 in the bottom thereof. A pair of door hangers 17 and 18, bolted to the door, extend upward through slot 16 into the interior of box girder 14. As seen in FIG. 2, hanger 18 has affixed at its upper end a lateral member 19 to each end of which are affixed a pair of rollers 21 and 22 which are free to rotate on lateral member 19. In like manner, hanger member 17 is affixed to a cross piece and rollers, not shown.

Figure 3:
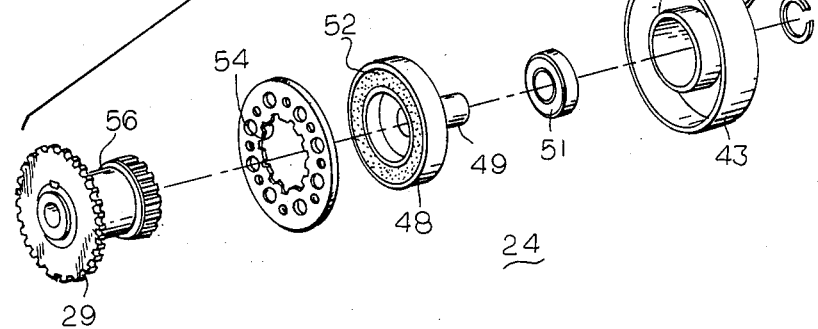
FIG. 3 is a perspective exploded view of the magnetic clutch of the invention.

The actuating system for door 13 comprises an electric motor 23 having sufficient power to actuate and drive door 13. The door 13, as on most industrial type refrigerators or coolers, is between five feet and seven feet and ten feet by twelve feet in dimensions and weighs between one hundred fifty and three hundred pounds. It has been found that a one-half horsepower 230 volt, three phase alternating current reversible motor is sufficient to drive the door. Motor 13 drives an electromagnetic clutch 24 through a gear box 26. The clutch 24, when actuated, drives a sprocket chain 27. Door 13 is connected to sprocket chain 27 by a dog 28 which is bolted to the door and extends upward between links of chain 27 to produce a positive drive for door 13. Chain 27 is driven by electromagnetic clutch 24 by means of a gear sprocket 29, which is shown in FIG. 3. At the other end of chain 27, which is an endless loop, is an idler gear sprocket 31, around which chain 27 loops.

Figure 2A:
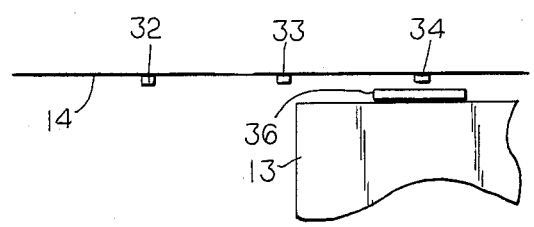
FIG. 2a is a view of the door actuated leaf switches for controlling door movement.
Figure 4:
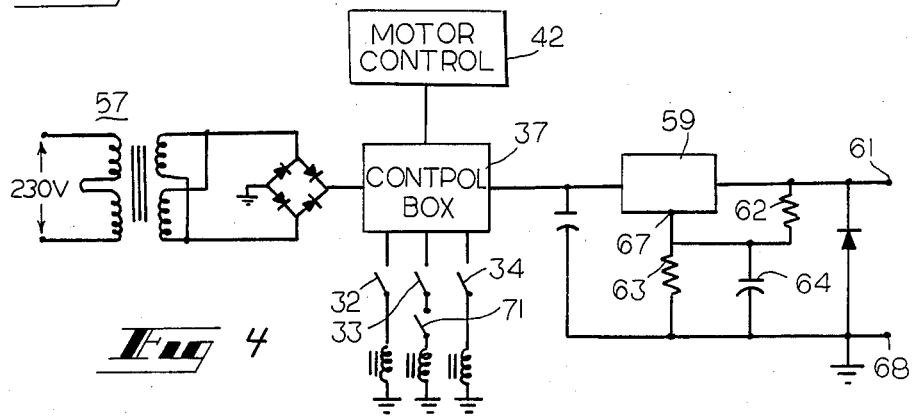
FIG. 4 is a partially diagrammatic, partially schematic view control circuitry for the magnetic clutch.

Mounted on girder 14 are first, second, and third magnetic leaf switches 32, 33, and 34 respectively, as seen in FIGS. 2a and 4. Mounted on the top of door 13 is an elongated bar magnet 36 which activates each leaf switch in turn as it passes thereunder. Leaf switches 32, 33, and 34 are connected to a control box 37 by electrical leads and, when actuated, operate solenoids within the control box 37 for actuating magnetic clutch 24 and motor control 42, for reversing the motor, as will be explained more fully hereinafter.

In FIG. 3 there is depicted the magnetic clutch 24 and the component parts thereof. Clutch 24 comprises a housing 44 and an energizing coil mounted thereon. The coil is energized through leads 46 and 47 from control box 37. Housing 44 is of magnetic material so that when the coil is energized, housing 44 is likewise magnetized. Mounted within housing 44 is a driving member 48 having a shaft 49 mounted in a ball bearing race 51. Shaft 49 is keyed to the drive shaft or armature, not shown, of gear box 26, and is free to turn within housing 44. Contained within driving member 48 in an annular chamber is a ring 52 of magnetic powder which becomes magnetized when the coil and housing 44 are magnetized. A driven member, in the form of an annular ring of magnetizable material, has a tooth central opening 54, as shown. The drum member is contained within housing 56 is spliced at one end thereof, the splices meshing with the gear teeth in opening 54. Mounted on and keyed to the other end of shaft 56 is sprocket gear 29. When the coil is is energized, magnetic material 52 is magnetized and the ring is pulled into contact with member 48, and held there. When drive member 48 is rotating, the driven member also rotates, causing drive sprocket 29 to rotate.

In FIG. 4, there is shown the energizing and de-energizing circuit for clutch 24. A power supply 57 supplies D.C. power to control box 37 and, through box 37 to clutch 24 through the soft start circuit. Thus, the circuit comprises a voltage regulator 59, which is a commercially available unit designated LM317T. The output of regulator 59 is applied to terminal 61 and, through a voltage divider network comprising resistors 62 and 63 and capacitor 64, to grounded terminal 68. Terminals 61 and 68 are connected to the coil within housing 44 of clutch 24. One terminal of capacitor 64 is connected to the adjust terminal 67 of regulator 59, as is the junction between resistors 62 and 63. Adjust or reference terminal 67 supplies regulator 59 with the reference voltage needed to enable it to regulate the output voltage.

OPERATION

In the operation of the door actuating system, when door 13 is closed and motor 23 is running, the operator activates the system by pulling a pull switch, not shown, which causes voltage to be applied to the input of regulator 59. The output of regulator 59 initially passes through resistor 62 and capacitor 64 to ground and adjust terminal 67 is at approximately ground potential, causing regulator 59 immediately to reduce its voltage output to a low level. As capacitor 64 charges, the voltage on terminal 67 rises, while more and more of the current through resistor 62 is shunted through resistor 63. When capacitor 64 is fully charged, a steady state condition is reached, where the voltage across terminals 61 and 68 is the voltage drop through resistors 62 and 63, and regulator 59 supplies a steady voltage output. The voltage across terminals 61 and 68 is sufficient to energize clutch 24 completely in the steady state condition, but during the build-up to the steady state condition clutch 24 is not fully energized, and some slippage occurs. Thus, the drive sprocket 29 is not driven at its normal, steady state speed initially, but builds up to speed as more and more voltage is applied to the clutch energizing terminals. It has been found adequate to have a finite build-up time of approximately two seconds to a steady state speed of movement of door 13 of twenty-nine inches per second. To achieve this, for a three hundred pound door, resistor 62 is given a value of 6200 ohms, resistor 63 is 330 ohms, and capacitor 64 is approximately 220 microfarads. These values can be varied to alter the build up time, or to accommodate a door of a different weight. It is possible to make the capacitor adjustable to achieve some variation and to achieve an optimum build up, or ramp time.

As the door opens, magnet 36 passes under switch 33, and activates it. This switch 33 can be regarded as a "half-open" switch, which shuts off the voltage to clutch 24 when the door is only half-open. Thus, when a person wishes to enter the refrigerator, as opposed to driving a fork-lift truck into the refrigerator, it is only necessary that the door be partially opened, which can be achieved by closing a switch 71 in series with switch 33. However, unless switch 71 is closed, activation of switch 33 by magnet 36 has not effect, and door 13 continues to move towards its fully open position. When magnet 36 passes under switch 34, switch 34 is activated, and, through relays in control box 37, cuts off voltage to clutch 24 it can also can be made to reverse motor 23. Switch 34 is positioned so that clutch 24 is disengaged before the door has reached its maximum limit of travel, and the door is allowed to coast to a stop. If necessary, bumpers, not shown, may be mounted on the referigerator wall 12 to define the maximum limit of travel of door 13. With the system of the invention, the door may coast into the bumpers, but it is not driven against them. It can be appreciated that this arrangement results in a drastic reduction in shocks to the drive system.

In closing the door, the system operates in the same way, except that deactivation of clutch 24 and motor occurs when leaf switch 32 is activated. As with switch 34, switch 32 is positioned to deactivate clutch 24 before the limit of travel of door 13 has been reached, thus allowing it to coast to the limit, which again may be defined by bumpers, if desired.

From the foregoing description of a preferred embodiment of the invention, it can be seen that a simple, reliable container door actuating system which eliminates many of the drawbacks of the prior art has been provided. Numerous modifications of the preferred embodiment may occur to workers in the art without departure from the spirit and scope of the invention.

I claim:

1. A door actuating system comprising:
   motive power means for supplying a driving force to said system;
   driven means adapted to be connected to a door to produce motion thereof;
   means including a voltage activated member for transmitting the driving force from said motive power means to said driven means; and a voltage source for activating said member, said voltage source including voltage control means for causing the voltage applied to voltage activated member to increase over a finite period to a steady state value, said voltage control means including a voltage regulator having an input, an output, and a reference voltage terminal.

2. A door actuating system as claimed in claim 1 wherein said voltage control means further includes a voltage divider network connected in circuit with the output of said voltage regulator, said reference voltage terminal, and ground, said network including a capacitor connected between the reference voltage terminal and ground.

3. The door actuating system of claim 1 wherein said finite period is approximately two seconds.

4. A door actuating system for use with a container having a stationary portion and a sliding door portion movable along a track, and with the door acutating system comprising:

an electric motor mounted on the stationary portion;
a chain drive mechanism mounted on the stationary portion and connected to the door portion;
a voltage activated member for connecting said motor to said chain drive mechanism;
a voltage source;
voltage control means connected to said voltage source and to said voltage activated member, said voltage control means including means for causing the voltage applied to said voltage activated member to increase over finite period to a steady state value comprising a voltage regulator having an output terminal and a reference terminal and a voltage divider network connected to the output of said voltage regulator and to said reference terminal, said network including a first resistor connected between said output terminal and said reference terminal, a second resistor connected from said reference terminal to ground and a capacitor connected in parallel with said second resistor.

* * * * *